United States Patent [19]
Guidetti

[11] 3,957,100
[45] May 18, 1976

[54] PNEUMATIC WHEEL FOR TRAVEL ON ALL TYPES OF TERRAIN

[76] Inventor: Jean Guidetti, 8 Avenue de Gairaut, Nice 06100, France

[22] Filed: Feb. 6, 1975

[21] Appl. No.: 547,877

[52] U.S. Cl. ................................ 152/9; 152/151; 301/5 R
[51] Int. Cl.² .................. B60B 9/00; B60C 5/00
[58] Field of Search .............. 152/9, 5, 151, 155, 152/165, 323, 327; 301/5 R, 1 R

[56] References Cited
UNITED STATES PATENTS

| | | | |
|---|---|---|---|
| 1,851,880 | 3/1932 | Van Wormer | 301/5 R |
| 2,190,905 | 2/1940 | Welch | 152/9 |
| 2,692,801 | 10/1954 | Rosenberg | 152/323 |
| 3,154,126 | 10/1964 | Katter | 152/9 |

*Primary Examiner*—Drayton E. Hoffman
*Attorney, Agent, or Firm*—Haseltine, Lake & Waters

[57] ABSTRACT

A pneumatic wheel comprising an inflatable element of substantially toroidal shape having a central tubular passage, and a hub disposed in the central passage. The hub and inflatable element are frictionally coupled without being physically secured together whereby since no physical connection exists between the hub and the inflatable element the latter can freely deform in the vicinity of the hub.

12 Claims, 5 Drawing Figures

PNEUMATIC WHEEL FOR TRAVEL ON ALL TYPES OF TERRAIN

FIELD OF THE INVENTION

The invention relates to a pneumatic wheel particularly adapted for easy travel on all types of ground surface, thanks to which light push carriages such as carts, baby carriages, wheel barrows, etc. can be displaced as easily on dry sand as on hard ground.

The term "pneumatic wheel" as used hereafter is intended to comprise essentially an inflatable element of substantially toroidal shape and which will be called a "tire" and a non-inflatable assembly comprising bearings serving for the passage of an axle or its journal end and which will be called a "hub."

BACKGROUND AND SUMMARY OF THE INVENTION

In order to better describe the invention, the evolution of this type of wheel will be described.

A conventional wheel comprises a hub, a tire, and a wheel body, for example, spokes. In a first stage of development, the tire was flexible, then it was made pneumatic. The tire was then developed to replace the wheel body in entirety. This is the final stage of evolution corresponding to a complete elimination of the wheel body and is known as a pneumatic wheel. Such wheel is described in U.S. Pat. No. 2,190,905.

The direction of this evolution which at the beginning sought comfort has evolved towards an adaptation to soft ground through the concern and the possibility of obtaining small light wheels which would not sink in the ground. The invention corresponds to a continuation of this evolution in the same direction to obtain even smaller, lighter wheels which will not sink in soft ground.

The pursued objective is therefore clear: with respect to the method, it consists of seeking to develop the advantageous possibility of deformation of the inflatable tire so that the surface of contact with the ground will be as great as possible. Fig. 1 of U.S. Pat. No. 2,190,905 clearly shows the capability of much greater deformation than conventional tires. By analyzing the deficiencies of recent pneumatic wheels, it will be shown how one can still advance even further.

In fact, wheels of average size best adapted to soft ground are, at present and without doubt, pneumatic wheels. For easy travel on such ground these wheels inclusive of the wheels of the aforenoted U.S. patent have two deficiencies:

1. They are too large. In fact, they are never less than a diameter of 30 – 40 cm. undoubtedly, they would be much more expensive if made smaller, but there is also another reason which is less evident: on soft ground in order for a wheel not to sink, it should be especially soft as it becomes small. When a small wheel is made with the same material of a satisfactory large wheel, it therefore would become overloaded, or too thin or too hard. By definition, in order to make the wheels smaller yet with the same properties, it is necessary to adapt a more flexible material.

2. The hub is connected to the tire. This is certainly not a deficiency in and of itself, and this corresponds, in contrast, to the possibility of driving the wheel through its hub; however, from an examination of FIG. 1 of the aforesaid U.S. Patent, it clearly appears that by elimination of this capability, one could eliminate all reinforcement of the polar regions and even all connection between the hub and the tire, which would immediately lead to a much simpler manufacture and much greater deformation. Experience shows that these possibilities of deformation are real, however, on the condition that the material of the tire is itself made more deformable and more flexible than the materials in actual use. By realizing a pneumatic wheel whose tire is sufficiently flexible with a hub to which it is not connected, the two deficiencies are overcome. This is the aim to be attained by the present invention whose object is to provide a pneumatic wheel constituted by an inflatable element of substantially toroidal shape with a tubular central passageway and a hub disposed in said central passageway, said pneumatic wheel being characterized by the elimination of any connection between the hub and inflatable element, such that the latter can freely deform in the vicinity of the hub.

The two principal characteristics of the invention reside in the use of a more flexible tire and in the absence of any physical connection between the tire and the hub. Moreover, the invention is not concerned with the tire alone, as satisfactory tires already exist. Furthermore, the manufacture of such inflatable tires with a central tubular passage from a plastisol is known from French Pat. No. 1,423,095 (Verigold). The tires are produced therein by rotation and they have sufficient flexibility.

It is in the independence of the tire and the hub that the essential characteristics of the invention reside because this permits on the one hand the selection of the tire from those currently existing and on the other hand a substantial doubling of the practical performance of the wheel.

The wheels according to the invention provide three categories of advantages:

1. Simpler and therefore more economical manufacture.

2. Better performance, because for equal sizes, they can carry as much with a fraction of the pressure.

3. The capability of making the wheels considerably smaller, up to 10 cm. in diameter, without any sinking whatever.

By simply using tires made by rotation (method cited above) one can select from an available range of sizes, shapes, thicknesses and of suitable materials in order to be able to equip small handling appliances currently existing or for development in the future, (toys, carts, baby carriages, wheel barrows, etc.) with wheels exactly adapted to each appliance and to the ground on which it is to travel. For very light wheels as well as wheels especially adapted for travel on dry beach sand, and sand hills and able to easily roll under a weight reaching and even exceeding fifty times its weight (100 kg. for a wheel of 2.5 kg., 15 kg. for a wheel of 250 g.). Carts equipped with wheels of this type make transport easy, even for children, of heavy loads such as bottles of liquefied gas, jerrycans, garbage cans, etc. over plowed earth, sand, gravel and even steps.

According to a particular embodiment of the invention, the hub comprises a tube engaged in the central passage of the inflatable element, and the tube is closed at its ends by closure elements which expand the ends sufficiently to prevent the tube from separating from the central passage.

Elongated and endowed with two bearings, the hub is excellent. Furthermore, since it only has to resist insignificant forces, it can be flexible which is not a property to be ignored.

These great possibilities of deformation, accompanied with the simplicity provided by the wheel of the invention, provide a vast field of use. These wheels, which do not sink, can be made resistant to rusting by making the bearings of plastic and the axle of stainless steel. They are then perfectly adaptable for handling on beaches (transport from ships, etc.).

According to another embodiment of the invention, the hub comprises in the vicinity of its ends, two external annular collars opposing transverse sliding of the wheel while reinforcing the terminal portions of the hub.

The closure members form bearings and are prevented from separating from the hub due to the formation of annular elastic lips at the extremities of the hub which enclose the rear of the closure members after the latter have been forceably introduced into the hub. For convenience in mounting, the closure members are substantially frusto-conical and flared to a maximum diameter substantially greater than the internal diameter of the hub, so as to progressively dilate the extremities of the hub during their introduction. They include at the rear a portion of reverse conicity on which the lips of the hub come to rest thereby confining the closure members in the hub.

According to an advantageous characteristic of the invention, the hub has internal shoulders formed in its inner surface serving to limit the degree of penetration of the closure members. These shoulders can be constituted by the edges of an annular step formed by increased thickness of the wall in the central portion of the hub. In addition to its role as an abutment, such step in thickness confers to the hub a greater rigidity in its central portion.

In a modified arrangement, one of the bearings for the axle is directly incorporated by moulding into the hub. In this regard, the wall of the hub is thickened in the vicinity of one of its extremities and presents a cylindrical bore for the passage of the axle. The other extremity of the hub has a uniform thickness, sufficiently small, to be able to be deformed and introduced into the central passageway of the tire.

BRIEF DESCRIPTION OF THE DRAWING

The invention will next be described with reference to the attached drawings, in which.

DETAILED DESCRIPTION

The wheel according to the invention is constituted by an inflatable tire 1 which is substantially toroidal and has a central tubular passageway in which is introduced a tube 2 each of whose ends is closed by a conical closure member or plug 3 which dilates the tube and constitutes a bearing. The tire can be produced in any suitable manner notably by the rotation process of Verigord as disclosed in the aforenoted French patent. The tube can be flexible or rigid, the bearings being conical or of other suitable shape, and adhered or joined, or not to the tube. The axle (not shown) can even be integral with the bearings and only two constructional features are significant:

the tube must be flared at its extremities in order not to be separable from the tire and it must engage the tire only with friction allowing it to freely deform.

Figures 1, 2:
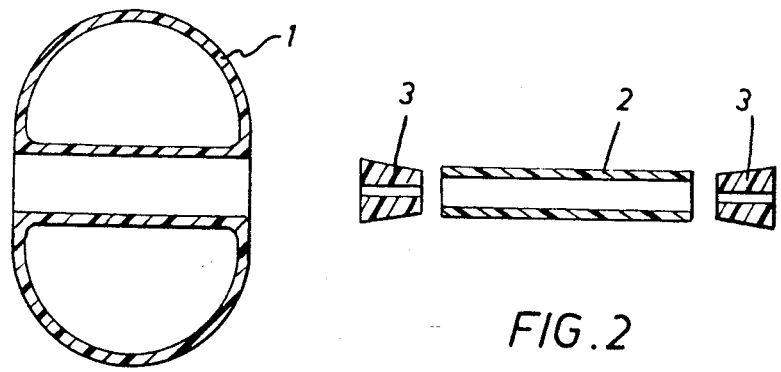
FIG. 1 is a radical sectional view through an inflatable tire.
FIG. 2 is a longitudinal sectional view of the hub of the pneumatic wheel according to a first embodiment.
Figure 3:
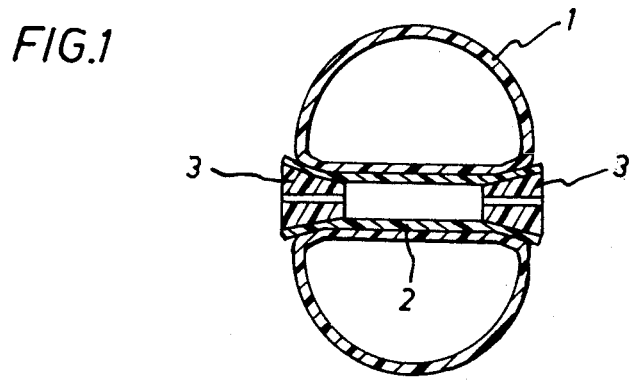
FIG. 3 is a radial sectional view of the pneumatic wheel in the assembled state.

In the embodiment of FIG. 2 the tube 2 is cylindrical and has a constant wall thickness.

Figure 4:
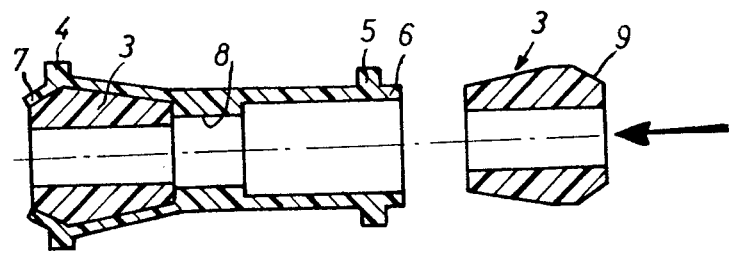
FIG. 4 is a longitudinal sectional view of a hub according to a second embodiment, one of the closure members being shown in place, the other being ready for introduction.

In the embodiment of FIG. 4, the tube has on its external surface, in the vicinity of its ends, two annular collars 4,5 whose purpose is to prevent the tire from transversely sliding on the tube. The tube is terminated by two annular lips 6,7. Finally, the tube comprises an internally thickened region 8 serving to reinforce the central portion of the tube and which defines two shoulders against which the closure members 3 come to abut. The latter are frustoconical, and flare to a maximum diameter greater than the internal diameter of the tube. They comprise at their ends a portion 9 of inverse conicity against which the lips 6,7, come to rest.

Figure 5:
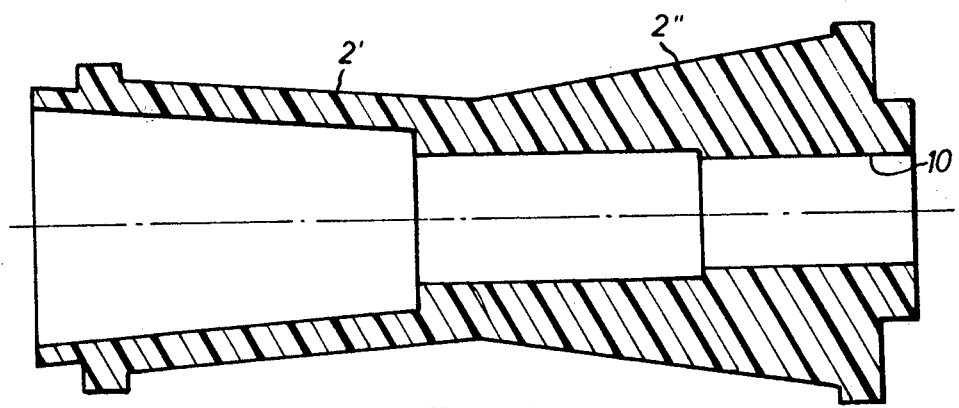
FIG. 5 is a longitudinal sectional view of a hub according to a third embodiment.

With reference to FIG. 5, the hub comprises a bearing incorporated by thickening the wall of the hub at one extremity. At said extremity, the hub has a cylindrical bore 10 for the passage of the axle (not shown). The other extremity of the hub has a constant wall thickness and receives a closure member of the type illustrated in FIG. 1.

In the embodiment of FIG. 5, the external surface of the hub has two frustoconical portions 2', 2'' of opposite conicity joined at their smaller diameter sections. Such a structure also contributes to the transverse sliding of the tire.

It is seen from the above that the construction of the wheel of the invention is such as to eliminate any physical connection securing the hub and wheel which would substantially interfere with free expansion of the tire and in this regard attention is directed to the fact that except for the inner passage of the tire where it slidably engages the hub, the tire is otherwise completely free to deform. The lateral restraint of the hub in the tire either by means of the conical closure members of FIG. 2 or by the addition of collars 4 and 5 as in the embodiments of FIGS. 4 and 5 does not have any practical effect on the capability of the tire to freely deform as it is not physically secured thereto but only frictionally engaged.

Although the invention has been described with reference to specific embodiments thereof, it is to be understood that numerous modifications and variations can be made without departing from the spirit and scope thereof as defined by the appended claims.

What is claimed is:

1. A pneumatic wheel comprising an inflatable element of substantially toroidal shape having a central tubular passage, a hub disposed in said central passage, and means frictionally coupling said hub and inflatable element without physically securing the same together so that no physical connection exists between said hub and the inflatable element thereby permitting the latter to freely deform in the vicinity of the hub and become locally spaced therefrom, said hub comprising a tube slidably engaged in said central passage of the inflatable element, said tube having extremities, said coupling means comprising conical closure plugs engaged in said extremities of the tube to dilate said extremities sufficiently to prevent the tube from separating from the central passage.

2. A pneumatic wheel as claimed in claim 1 wherein said plugs are each provided with an axial bore serving for passage of an axle.

3. A pneumatic wheel as claimed in claim 2 wherein said plugs serve as bearings for the axle.

4. A pneumatic wheel as claimed in claim 2 wherein said plugs are integral with the axle.

5. A pneumatic wheel as claimed in claim 1 wherein said hub comprises two external annular collars in the vicinity of said extremities opposing transverse sliding of the tire on the hub and reinforcing the hub at said extremities.

6. A pneumatic wheel as claimed in claim 5 comprising elastic annular lips at the extremities of said tube for engaging the rear of the plugs after the latter have been introduced into the hub thereby preventing the plugs from separating from the hub.

7. A pneumatic wheel as claimed in claim 6 wherein said plugs are substantially frusto-conical in shape and flare to a maximum diameter substantially greater than the internal diameter of the hub to progressively dilate the extremities of the hub during their introduction, said plugs having a portion of inverse conicity at the rear ends thereof against which the lips come to rest.

8. A pneumatic wheel as claimed in claim 5 wherein said hub is provided with internal shoulders adapted to limit the degree of penetration of said plugs, said shoulders being constituted by the edges of an annular projection formed by thickening the wall in the central portion of the hub.

9. A pneumatic wheel as claimed in claim 1 wherein said hub has a bore and includes an integral portion serving as a bearing for an axle introducible into the bore in said hub.

10. A pneumatic wheel as claimed in claim 9 wherein said hub has opposite ends, and the wall of the hub is thickened in the vicinity of one of its ends and has a cylindrical hole for the passage of the axle, the other end of the hub having a constant wall thickness sufficiently small to be able to be deformed and introduced into said central passage of the inflatable element.

11. A pneumatic wheel as claimed in claim 1 wherein the external surface of the hub has two frusto-conical portions of opposite conicity joined together at their smaller diameter sections.

12. A pneumatic wheel as claimed in claim 1 wherein said inflatable element has an annular enclosed air chamber.

* * * * *

UNITED STATES PATENT AND TRADEMARK OFFICE
CERTIFICATE OF CORRECTION

PATENT NO. : 3,957,100
DATED : May 18, 1976
INVENTOR(S) : GUIDETTI

It is certified that error appears in the above—identified patent and that said Letters Patent are hereby corrected as shown below:

Please cancel the drawing shown on page 1 of this patent and substitute therefor figure 1 as shown below:

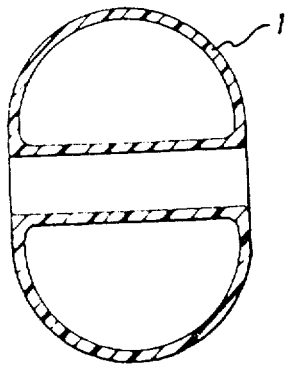

Signed and Sealed this

Twenty-fifth Day of January 1977

[SEAL]

Attest:

RUTH C. MASON
*Attesting Officer*

C. MARSHALL DANN
*Commissioner of Patents and Trademarks*